No. 864,299. PATENTED AUG. 27, 1907.
R. M. HALEY.
HOSE COUPLING.
APPLICATION FILED OCT. 17, 1906.
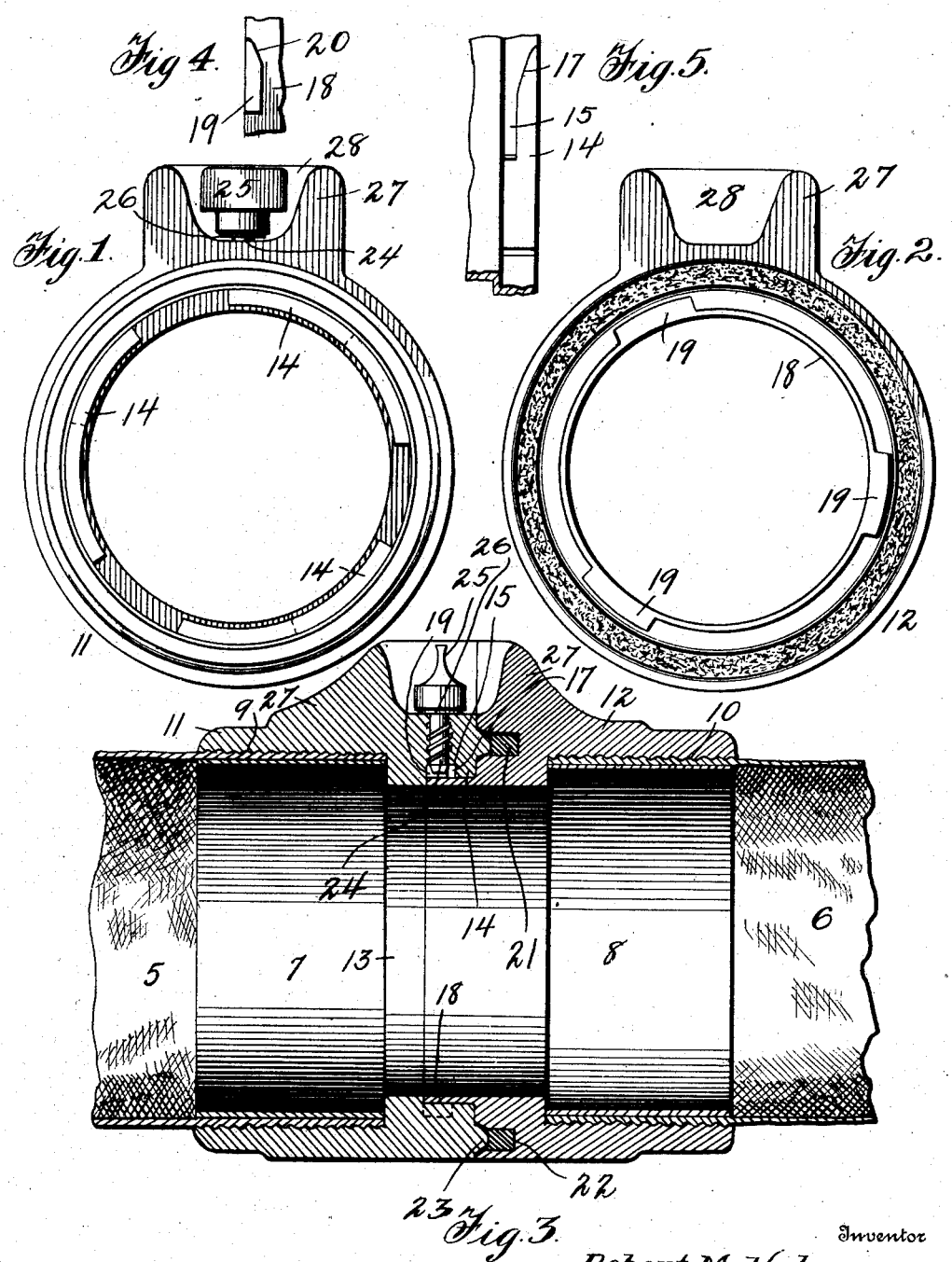
Witnesses
Frank G. Campbell.
Carl Stoughton
Inventor
Robert M. Haley,
By Shepherd & Parker
Attorneys

UNITED STATES PATENT OFFICE.

ROBERT M. HALEY, OF COLUMBUS, OHIO.

HOSE-COUPLING.

No. 864,299.   Specification of Letters Patent.   Patented Aug. 27, 1907.

Application filed October 17, 1906. Serial No. 339,341.

*To all whom it may concern:*

Be it known that I, ROBERT M. HALEY, a citizen of the United States, residing at Columbus, in the county of Franklin and State of Ohio, have invented certain new and useful Improvements in Hose-Couplings, of which the following is a specification.

My invention relates to hose couplings and has for its object the provision of a device of this character constructed in such manner that it may be very cheaply manufactured, will positively connect the two sections of hose to which it is attached, and one constructed in such manner that all of the parts will be protected from injury when the coupling is dragged along the ground.
Further objects and advantages of the invention will be set forth in the detailed description which now follows.

In the accompanying drawing: Figure 1 is an end view of the female member of the coupling, Fig. 2 is a like view of the male member of the coupling, Fig. 3 is a longitudinal vertical section illustrating the two parts of the coupling secured together, Fig. 4 is a detail view of one of the lugs carried by the male member of the coupling, and, Fig. 5 is a view illustrating the recess formed in the female member of the coupling.

Like numerals designate corresponding parts in all of the figures of the drawing.

Referring to the drawing, the numerals 5 and 6 designate the two sections of hose which are to be secured together. Expander rings 7 and 8 secure these two sections of hose in corrugated portions 9 and 10 of the female member 11 and the male member 12 of the coupling. The member 11 has an annular flange 13 and a plurality of ribs 14 (see Figs. 1 and 5), recesses 15 being formed behind portions of these ribs, said ribs terminating in beveled portions 17. A member 12 has a forwardly extending neck 18 upon which cam lugs 19 are mounted. These cam lugs are provided with beveled portions 20 which are adapted to engage the beveled portions 17, as the cam lugs 19 move into the recesses 15. A gasket 21 is located in a recess 22 of the member 12 and an annular rib 23 is forced against this gasket when the parts are brought together. A screw 24 which has a very quick thread formed thereon, is threaded into the member 11. A thumb piece 25 is carried by the upper end of this screw and a gasket 26 is located between the underside of this thumb piece and the wall of the member 11.

As is best illustrated in Figs. 1, 2 and 3, the sections 11 and 12 are enlarged as at 27 and these enlarged portions are recessed as at 28, so that when the two sections are brought together, a pocket is formed in which the thumbpiece 25 lies. By virtue of this construction the fastening provided by the screw 24, is protected from injury when the coupling is dragged along the ground. The gasket prevents any possibility of leakage about the screw 24 when the parts are secured together. The lugs 19 engaging in the recesses 15, provide efficient means for locking the two portions of the coupling together and at the same time forming a water tight connection by forcing the annular flange 23 against the gasket 22. After these lugs 19 have passed into the recesses, a partial turn of the screw 25 will cause the lower end of said screw to enter the mouth of one of the recesses 15 to prevent the return of said lugs, until the operator turns the thumb piece 25 to withdraw the screw from the path of said lug.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with a coupling member having recesses formed therein, of a second coupling member, lugs carried by said second coupling member which are adapted to enter said recesses and engage therein, and a fastening device controllable from the exterior of the coupling adapted to enter one of said recesses behind one of said lugs to prevent retrograde movement of said lugs, said coupling members having recessed portions which when brought together form a pocket in which said fastening device lies.

2. In a device of the character described, the combination with a coupling member having recesses formed therein, of a second coupling member, lugs carried by said second coupling member adapted to engage in the recesses of the first named member, and a screw threaded into the first named member and adapted to enter one of said recesses behind one of said lugs to prevent retrograde movement of said lug, said members having recessed portions which when brought together form a pocket in which the outer portion of said screw lies.

3. In a device of the character described, the combination with a female coupling member having a series of cam recesses formed therein, of a male coupling member, a series of cam lugs carried by said male coupling member which are adapted to engage in said cam recesses, when the parts are brought together, and a screw threaded into the female coupling member and adapted to enter one of the cam recesses behind one of the cam lugs, each of said coupling members having an enlarged recessed boss formed thereon, the recessed portions of said boss when the parts are brought together forming a pocket in which the outer portion of said screw is seated.

4. In a device of the character described, the combination with a female coupling member having a series of cam recesses formed therein, of a male coupling member, a series of cam lugs carried by said male coupling member which are adapted to engage in said cam recesses, a gasket carried by one of said members, and an annular flange carried by the other of said members and adapted to be pressed against said gasket when the parts are brought together, a screw threaded into the female coupling member and adapted to enter one of the cam recesses behind one of the cam lugs, each of said coupling members having an enlarged recessed boss formed thereon, the recessed portions of said boss when the parts are brought together forming a pocket in which the outer portion of said screw is seated, and a gasket adapted to form a water tight connection about said screw.

In testimony whereof I affix my signature in presence of two witnesses.

ROBERT M. HALEY.

Witnesses:
A. L. PHELPS,
FRANK G. CAMPBELL.